(12) United States Patent
Rouillard

(10) Patent No.: US 9,445,610 B1
(45) Date of Patent: Sep. 20, 2016

(54) CONTAINER AND DISPENSER APPARATUS FOR SLICED FRUIT

(71) Applicant: David J. Rouillard, Reading, MA (US)

(72) Inventor: David J. Rouillard, Reading, MA (US)

( * ) Notice: Subject to any disclaimer, the term of this patent is extended or adjusted under 35 U.S.C. 154(b) by 371 days.

(21) Appl. No.: 14/089,947

(22) Filed: Nov. 26, 2013

(51) Int. Cl.
*B67D 7/80* (2010.01)
*A23B 7/04* (2006.01)

(52) U.S. Cl.
CPC ...................... *A23B 7/04* (2013.01)

(58) Field of Classification Search
CPC ...... A23B 7/04; A23B 7/048; A23B 7/0433; A23B 7/0425; A23B 7/05; A23B 4/062; A23B 4/066
USPC .......... 222/146, 6, 180, 181.1, 181.3, 185.1, 222/412, 413, 450, 454, 460–462, 52, 63; 62/3.6, 407, 440
See application file for complete search history.

(56) References Cited

U.S. PATENT DOCUMENTS

| | | | |
|---|---|---|---|
| 3,422,987 A | 1/1969 | Crabb | |
| 4,265,095 A * | 5/1981 | McConachie | A23B 7/0425 62/373 |
| 4,790,457 A * | 12/1988 | Morse | A47F 1/035 222/158 |
| 5,139,173 A * | 8/1992 | Evinger | A47F 1/03 222/156 |
| 5,544,572 A | 8/1996 | Garmendia | |
| 5,782,094 A * | 7/1998 | Freeman | A47F 3/0404 62/3.6 |
| D398,652 S | 9/1998 | Johnson | |
| 5,826,754 A * | 10/1998 | Ishaya | A47F 1/03 222/185.1 |
| 6,295,820 B1 | 10/2001 | Caucy et al. | |
| 7,296,422 B2 | 11/2007 | Strohm et al. | |
| 7,308,796 B1 * | 12/2007 | Eager | F25B 21/02 62/3.2 |
| 7,832,598 B2 * | 11/2010 | Rode | G01F 13/005 222/1 |
| 8,186,544 B2 * | 5/2012 | Mills | B65D 83/0083 141/360 |
| 2008/0006131 A1 | 1/2008 | Jones | |
| 2013/0126556 A1 * | 5/2013 | Riester | B65D 83/06 222/135 |

* cited by examiner

*Primary Examiner* — Lien Ngo

(57) ABSTRACT

A container and dispenser apparatus for sliced fruit stores, cools, and dispenses sliced wedges of fruit such as lemons. The apparatus includes a housing. A first interior wall extends through an interior space of the housing defining a fruit holding chamber. The fruit holding chamber is configured for holding a plurality of fruit wedges therein. An output opening is formed in the fruit holding chamber. The output opening is configured to receive the fruit wedges therethrough. A base is coupled to the housing. An input opening is positioned in the base. The input opening is aligned with the output opening such that the base is configured to receive the fruit wedges from the fruit holding chamber.

17 Claims, 5 Drawing Sheets

CONTAINER AND DISPENSER APPARATUS FOR SLICED FRUIT

BACKGROUND OF THE DISCLOSURE

Field of the Disclosure

The disclosure relates to container devices and more particularly pertains to a new container device for storing, cooling and dispensing sliced wedges of fruit such as lemons.

SUMMARY OF THE DISCLOSURE

An embodiment of the disclosure meets the needs presented above by generally comprising a housing. A first interior wall extends through an interior space of the housing defining a fruit holding chamber. The fruit holding chamber is configured for holding a plurality of fruit wedges therein. An output opening is formed in the fruit holding chamber. The output opening is configured to receive the fruit wedges therethrough. A base is coupled to the housing. An input opening is positioned in the base. The input opening is aligned with the output opening such that the base is configured to receive the fruit wedges from the fruit holding chamber.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
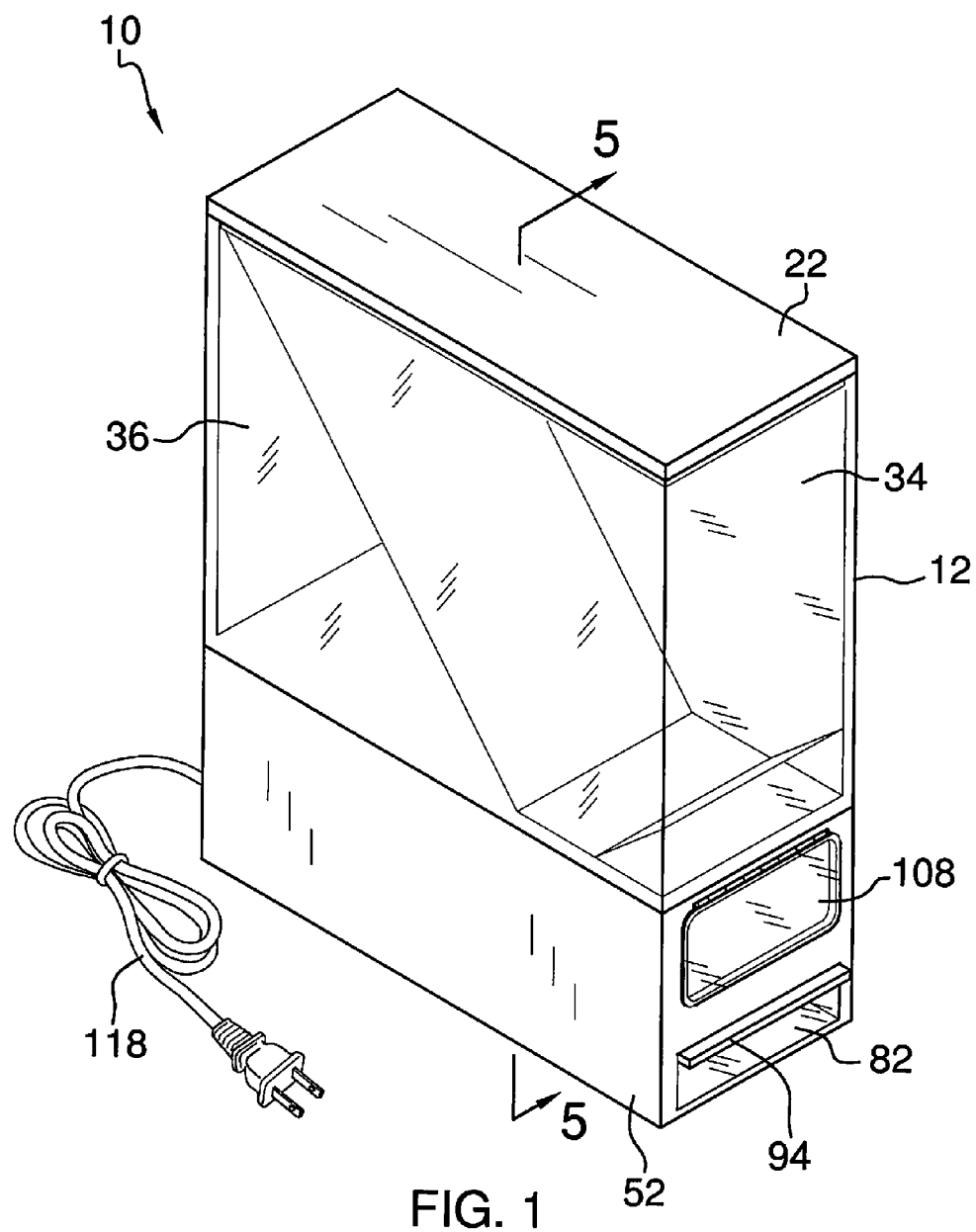
FIG. 1 is a top front side perspective view of a container and dispenser apparatus for sliced fruit according to an embodiment of the disclosure.
Figure 2:
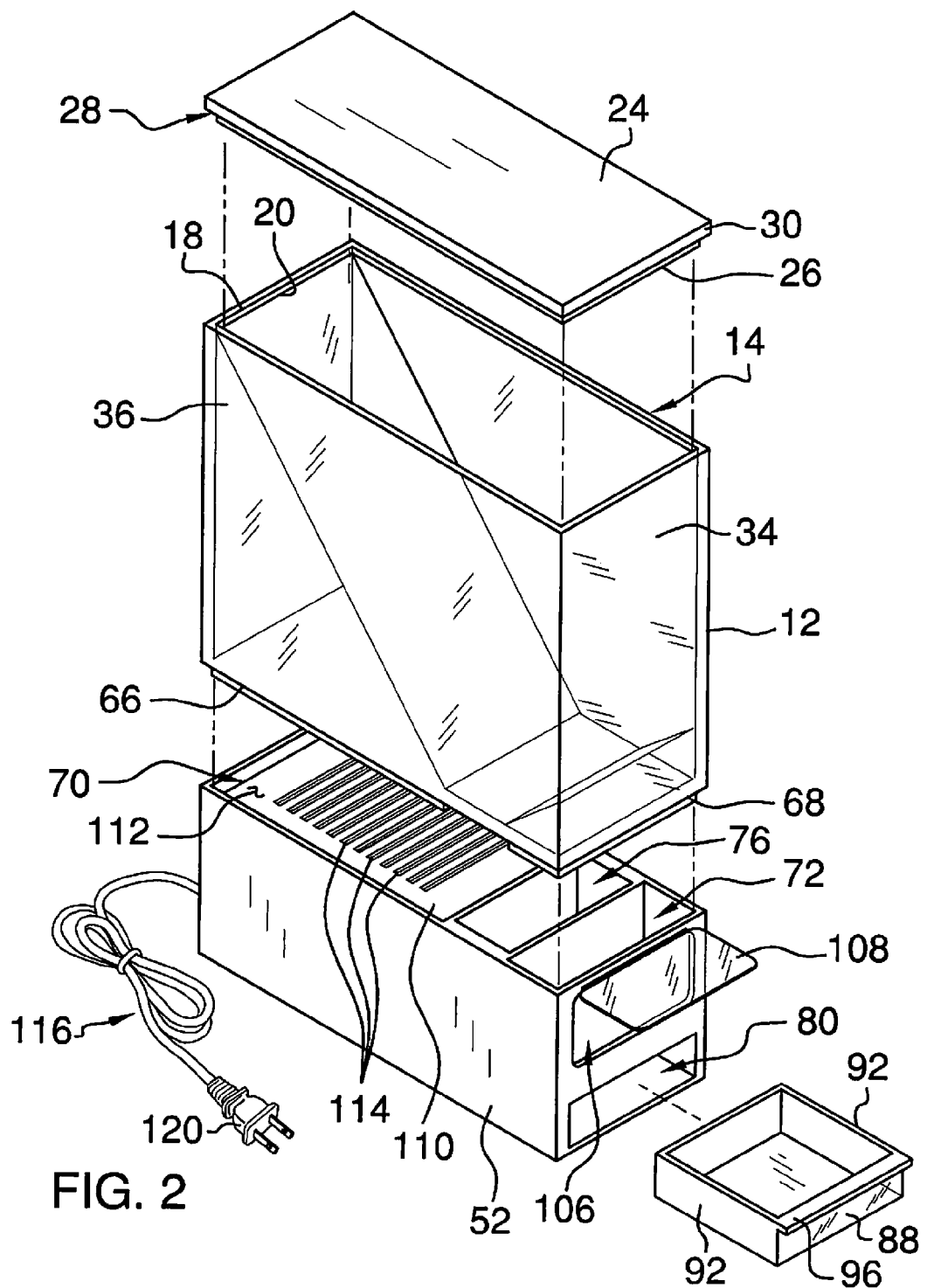
FIG. 2 is an exploded top front side perspective view of an embodiment of the disclosure.
Figure 3:
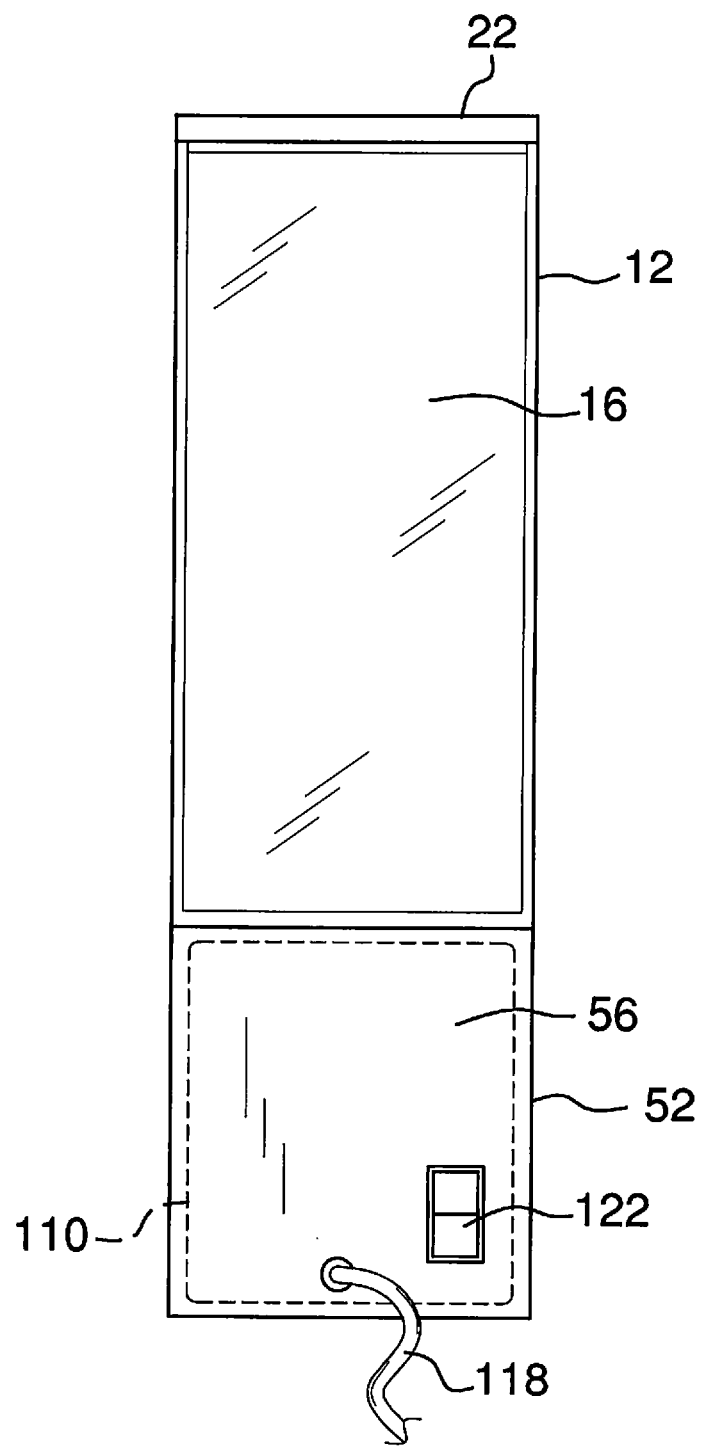
FIG. 3 is a back view of an embodiment of the disclosure.
Figure 4:
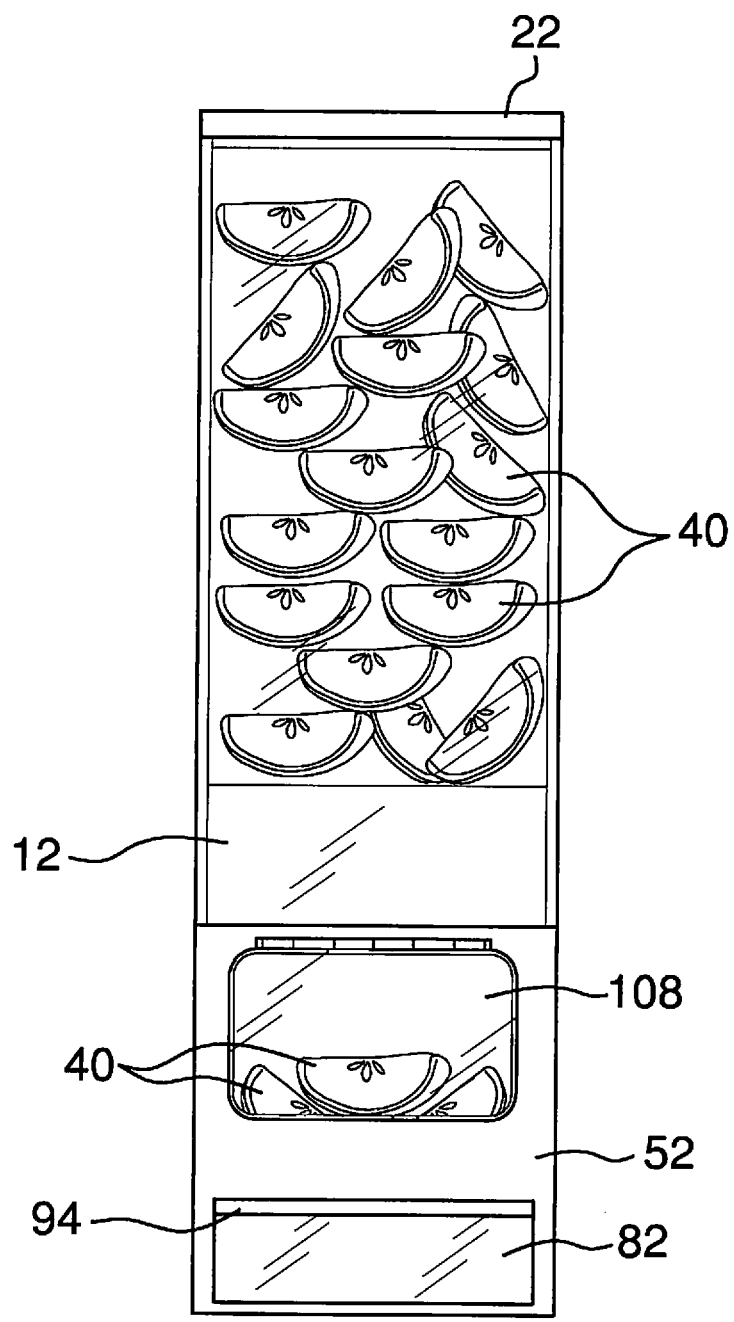
FIG. 4 is a front view of an embodiment of the disclosure.
Figure 5:
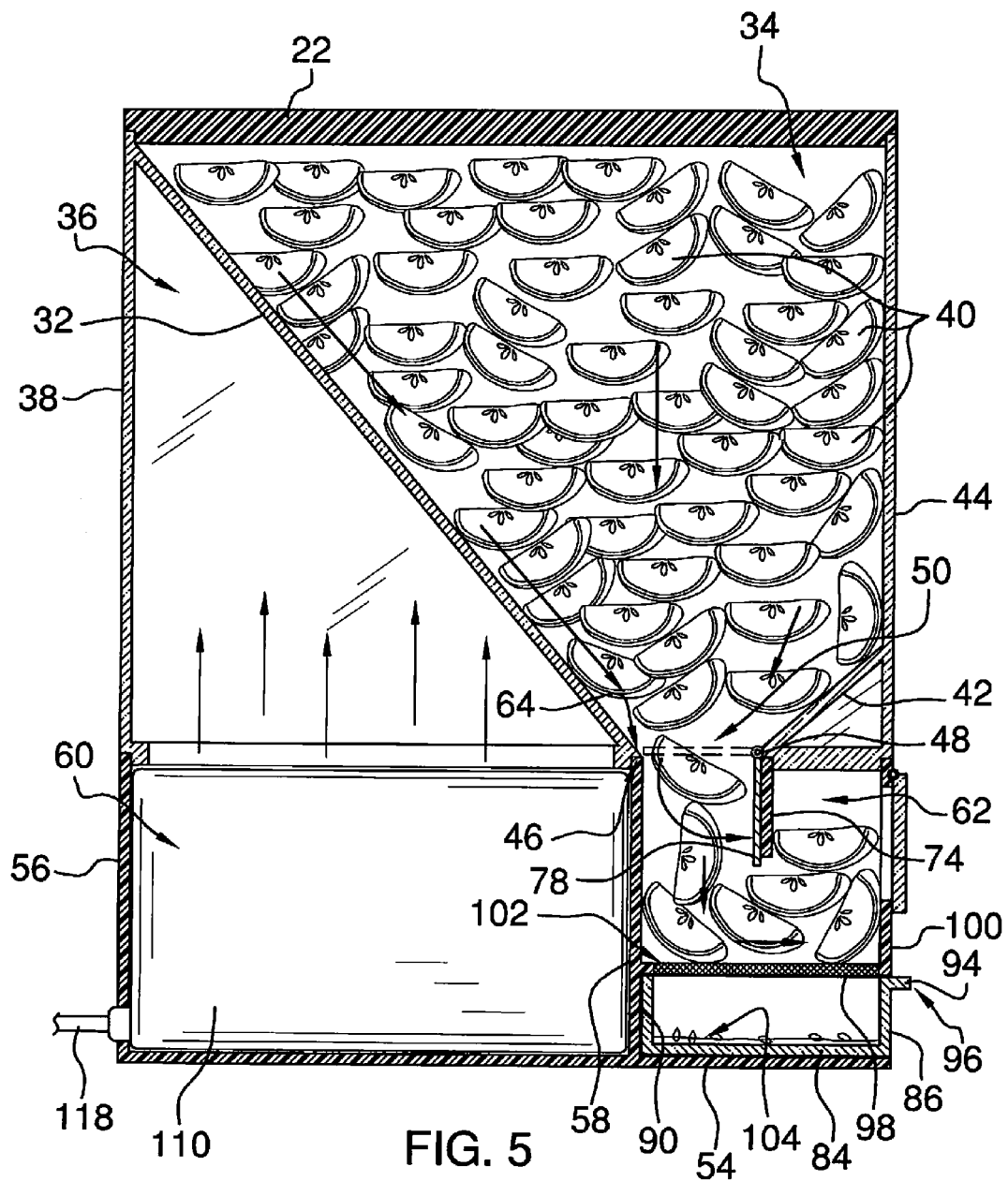
FIG. 5 is a cross-sectional view of an embodiment of the disclosure taken along line 5-5 of FIG. 1.

With reference now to the drawings, and in particular to FIGS. 1 through 5 thereof, a new container device embodying the principles and concepts of an embodiment of the disclosure and generally designated by the reference numeral 10 will be described.

As best illustrated in FIGS. 1 through 5, the container and dispenser apparatus for sliced fruit 10 generally comprises a housing 12 having an open top 14 and a perimeter wall 16 coupled to and extending downwardly from a perimeter edge 18 of the open top 14. The perimeter edge 18 of the open top 14 defines an access opening into an interior space of the housing 12. The housing 12 includes a lip 20 coupled to and extending inwardly from the perimeter edge 18 of the open top 14. The lip 20 extends a full length of the perimeter edge 18 around the access opening.

A lid 22 is positionable over the open top 14 of the housing 12 to selectively provide access to the interior space of the housing 12. The lid 22 has a main portion 24 and a flange portion 26. The flange portion 26 projects downwardly from a lower surface 28 of the main portion 24 and is inset relative to a peripheral wall 30 of the main portion 24. The lip 20 is complementarily sized and shaped relative to the flange portion 26 such that the flange portion 26 is retained by the lip 20 when the lid 22 is positioned over the access opening.

A first interior wall 32 extends through the housing 12 defining a fruit holding chamber 34 and an air receiving chamber 36. The first interior wall 32 extends inwardly from a first lateral side 38 of the perimeter wall 16. The fruit holding chamber 34 is configured for holding a plurality of fruit wedges 40, such as sliced lemons or the like, therein. The perimeter wall 16 of the housing 12 is translucent to permit viewing into the interior space of the housing 12. More particularly, an entirety of the perimeter wall 16 may be translucent or, alternatively, only the portion of the perimeter wall 16 that borders the fruit holding chamber 34 may be translucent. A second interior wall 42 extends through the housing 12. The second interior wall 42 extends inwardly from a second lateral side 44 of the perimeter wall 16. A bottom edge 46 of the first interior wall 32 is spaced from a bottom edge 48 of the second interior wall 42 and defines an output opening 50 configured to receive the fruit wedges 40 therethrough. Each of the first 32 and second 42 interior walls slants inwardly toward each other such that the first 32 and second 42 interior walls form a chute for directing the fruit wedges 40 toward the output opening 50.

A base 52 is removably coupled to the housing 12 to facilitate cleaning of the housing 12. The base 52 has a bottom 54 and a peripheral wall 56 coupled to and extending upwardly from the bottom 54. The base 52 has an interior dividing wall 58 extending therethrough defining a first compartment 60 and a second compartment 62. The first compartment 60 is positioned below the air receiving chamber 36. The second compartment 62 is positioned below the fruit holding chamber 34. The bottom edge 46 of the first interior wall 32 is positionable on an upper edge 64 of the interior dividing wall 58.

A pair of spaced flanges 66, 68 is coupled to the housing 12. A first one 66 of the flanges 66, 68 is positioned below the air receiving chamber 36. A second one 68 of the flanges 66, 68 is positioned below the fruit holding chamber 34. A pair of recessed areas 70, 72 extends into the base 52. A first one 70 of the recessed areas 70, 72 is aligned with the first one 66 of the flanges 66, 68 such that the first one 70 of the recessed areas 70, 72 is configured to receive the first one 66 of the flanges 66, 68 to releasably retain the housing 12 on the base 52. Similarly, a second one 72 of the recessed areas 70, 72 is aligned with the second one 68 of the flanges 66, 68 such that the second one 72 of the recessed areas 70, 72 is configured to receive the second one 68 of the flanges 66, 68 to releasably retain the housing 12 on the base 52. The second one 68 of the flanges 66, 68 may comprise a panel having substantially the same size as the second one 72 of the recessed areas 72.

An extension 74 is coupled to the base 52. The extension 74 is coupled to and extends downwardly from the bottom edge 48 of the second interior wall 42 when the housing 12 is coupled to the base 52. The extension 74 may be parallel with respect to the interior dividing wall 58. An input opening 76 is positioned in the base 52. The input opening 76 is positioned below the output opening 50 when the housing 12 is coupled to the base 52 such that the base 52 is configured to receive the fruit wedges 40 from the fruit holding chamber 34 through the input opening 76. An output door 78 is pivotally coupled to the housing 12 wherein the output door 78 is selectively positionable between an opened position providing access to an interior of the second compartment 62 and a closed position closing the output opening 50. The output door 78 abuts the extension 74 when the output door 78 is in the opened position such that the output door 78 is prevented from pivoting past the extension 74.

A slot 80 extends into the base 52. The slot 80 provides access to the interior of the second compartment 62. A drawer 82 is slidably insertable into the slot 80. The drawer 82 has a bottom wall 84 and a peripheral wall 86 extending upwardly from the bottom wall 84. The peripheral wall 86 of the drawer 82 includes a front wall 88, a rear wall 90 and a pair of lateral side walls 92 extending between the front 88 and rear 90 walls. A projection 94 is coupled to and extends outwardly from the front wall 88 of the drawer 82. The projection 94 forms a handle 96 configured to facilitate sliding of the drawer 82 into and out of the slot 80.

A screen 98 is positioned in the interior of the second compartment 62. The screen 98 extends between a first side 100 of the base 52 and the interior dividing wall 58. The screen 98 is positioned below the output door 78 and above the drawer 82 when the drawer 82 is fully extended into the base 52. The screen 98 forms a platform 102 configured to receive the fruit wedges 40 thereon when the fruit wedges 40 are passed into the second compartment 62 through the output opening 50. The screen 98 is configured to allow drainage 104 from the fruit wedges 40, such as fruit juice, seeds, condensation or the like, to pass therethrough and down into the drawer 82.

A dispenser opening 106 is positioned in the base 52. The dispenser opening 106 provides access to the interior of the second compartment 62. A dispenser door 108 is pivotally coupled to the base 52 wherein the dispenser door 108 is selectively positionable between an opened position providing access to the interior of the second compartment 62 and a closed position closing the dispenser opening 106. Thus, the dispenser door 108 allows the fruit wedges 40 to be dispensed therethrough when the dispenser door 108 is moved to the opened position. The fruit wedges 40 may be removed from the base 52 through the dispenser opening 106 using tongs or a user's hands, for example. The dispenser door 108 may be translucent to permit viewing into the interior of the second compartment 62 through the dispenser door 108.

A refrigeration unit 110 is positioned within the first compartment 60. An upper surface 112 of the refrigeration unit 110 has vents 114 positioned therein wherein the refrigeration unit 110 is configured to cool the air receiving chamber 36 to help keep the fruit wedges 40 fresh and moist. A power supply 116 is coupled to the base 52. The power supply 116 is electrically coupled to the refrigeration unit 110 to selectively provide power to the refrigeration unit 110. The power supply 116 may comprise a power cord 118 having a male plug-in end 120 configured for being inserted into an external electrical outlet. An actuator 122 is coupled to the base 52. The actuator 122 is electrically coupled to the refrigeration unit 110 wherein the actuator 122 is selectively actuated to provide power to the refrigeration unit 110 and selectively cool the air receiving chamber 36.

The apparatus 10 may have a height between approximately 45.0 centimeters and 85.0 centimeters; a width between approximately 15.0 centimeters and 35.0 centimeters; and a length between approximately 35.0 centimeters and 60.0 centimeters.

In use, as stated above and shown in the Figures, the housing 12 is attached to the base 52. The lid 22 is removed from the housing 12 so that fruit wedges 40, such as lemons, oranges or the like, can be placed into the fruit holding chamber 34. The actuator 122 is actuated to provide power to the refrigeration unit 110 to selectively cool the air receiving chamber 36. The first 32 and second 42 interior walls form a chute that directs the fruit wedges 40 from the fruit holding chamber 34, through the output opening 50 and into the second compartment 62. The screen 98 forms a platform 102 for receiving the fruit wedges 40 and includes apertures that allow drainage 104 from the fruit wedges 40 to pass therethrough. The drawer 82 is positioned below the screen 98 and collects drainage 104 from the fruit wedges 40. The dispenser door 108 is opened to retrieve the fruit wedges 40 from the second compartment 62. Tongs may be used to grasp individual fruit wedges 40 for sanitary removal of the fruit wedge 40 from the second compartment 62.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A container and dispenser apparatus for sliced fruit, said apparatus comprising:
    a housing;
    a first interior wall extending through an interior space of said housing and defining a fruit holding chamber, said fruit holding chamber being configured for holding a plurality of fruit wedges therein, said first interior wall further defining an air receiving chamber;
    an output opening being formed in said fruit holding chamber, said output opening being configured to receive the fruit wedges therethrough;
    a base coupled to said housing;
    an input opening positioned in said base, said input opening being positioned below said output opening such that said base is configured to receive the fruit wedges from said fruit holding chamber through said input opening; and a refrigeration unit positioned within said base, an upper surface of said refrigeration unit having vents positioned therein wherein said refrigeration unit is configured to cool said air receiving chamber.

2. The apparatus of claim 1, further comprising:
said housing having an open top and a perimeter wall coupled to and extending downwardly from a perimeter edge of said open top, said perimeter edge of said open top defining an access opening into said interior space of said housing; and
a lid positionable over said open top of said housing to selectively provide access to said interior space of said housing.

3. The apparatus of claim 2, further comprising:
said housing including a lip coupled to and extending inwardly from said perimeter edge of said open top, said lip of said housing extending a full length of said perimeter edge around said access opening; and
said lid having a main portion and a flange portion, said flange portion projecting downwardly from a lower surface of said main portion and being inset relative to a peripheral wall of said main portion, said lip being complementarily sized and shaped relative to said flange portion such that said flange portion is retained by said lip when said lid is positioned over said access opening.

4. The apparatus of claim 1, further comprising a perimeter wall of said fruit holding chamber being translucent to permit viewing into said interior space of said fruit holding chamber.

5. The apparatus of claim 1, further comprising a second interior wall extending through said interior space of said housing, a bottom edge of said first interior wall being spaced from a bottom edge of said second interior wall and defining said output opening therebetween, each of said first and second interior walls slanting inwardly toward each other such that said first and second interior walls form a chute for directing the fruit wedges toward said output opening.

6. The apparatus of claim 1, further comprising said base being removably coupled to said housing.

7. The apparatus of claim 1, further comprising said base having a bottom and a peripheral wall coupled to and extending upwardly from said bottom, said base having an interior dividing wall extending therethrough defining a first compartment and a second compartment, said first compartment being positioned below said air receiving chamber and storing said refrigeration unit therein, said second compartment being positioned below said fruit holding chamber.

8. The apparatus of claim 1, further comprising:
a pair of spaced flanges coupled to said housing, a first one of said flanges being positioned below said air receiving chamber, a second one of said flanges being positioned below said fruit holding chamber; and
a pair of recessed areas extending into said base, a first one of said recessed areas being aligned with said first one of said flanges such that said first one of said recessed areas is configured to receive said first one of said flanges to releasably retain said housing on said base, a second one of said recessed areas being aligned with said second one of said flanges such that said second one of said recessed areas is configured to receive said second one of said flanges to releasably retain said housing on said base.

9. The apparatus of claim 7, further comprising an output door being pivotally coupled to said housing wherein said output door is selectively positionable between an opened position providing access to an interior of said second compartment and a closed position closing said output opening.

10. The apparatus of claim 5, further comprising:
an extension coupled to said base, said extension being coupled to and extending downwardly from said bottom edge of said second interior wall; and
an output door being pivotally coupled to said housing wherein said output door is selectively positionable between an opened position providing access to an interior of said base and a closed position closing said output opening, said output door abutting said extension when said output door is in the opened position.

11. The apparatus of claim 7, further comprising:
a slot extending into said base, said slot providing access to an interior of said second compartment; and
a drawer being slidably insertable into said slot, said drawer having a bottom wall and a peripheral wall extending upwardly from said bottom wall, said peripheral wall of said drawer including a front wall, a rear wall and a pair of lateral side walls extending between said front and rear walls.

12. The apparatus of claim 11, further comprising a projection coupled to and extending outwardly from said front wall of said drawer, said projection forming a handle configured to facilitate sliding of said drawer into and out of said slot.

13. The apparatus of claim 11, further comprising a screen positioned in said interior of said second compartment, said screen being positioned below said output door and above said drawer when said drawer is fully extended into said base, said screen forming a platform configured to receive the fruit wedges thereon when the fruit wedges are passed into said second compartment through said output opening, said screen being configured to allow drainage from the fruit wedges to pass therethrough and down into said drawer.

14. The apparatus of claim 7, further comprising:
a dispenser opening positioned in said base, said dispenser opening providing access to said interior of said second compartment; and
a dispenser door being pivotally coupled to said base wherein said dispenser door is selectively positionable between an opened position providing access to said interior of said second compartment and a closed position closing said dispenser opening.

15. The apparatus of claim 1, further comprising a power supply coupled to said base, said power supply being electrically coupled to said refrigeration unit to selectively provide power to said refrigeration unit.

16. The apparatus of claim 15, further comprising an actuator coupled to said base, said actuator being electrically coupled to said refrigeration unit wherein said actuator is selectively actuated to provide power to said refrigeration unit for selectively cooling said air receiving chamber.

17. A container and dispenser apparatus for sliced fruit, said apparatus comprising:
a housing having an open top and a perimeter wall coupled to and extending downwardly from a perimeter edge of said open top, said perimeter edge of said open top defining an access opening into an interior space of said housing, said housing including a lip coupled to and extending inwardly from said perimeter edge of said open top, said lip of said housing extending a full length of said perimeter edge around said access opening;
a lid positionable over said open top of said housing to selectively provide access to said interior space of said housing, said lid having a main portion and a flange portion, said flange portion projecting downwardly from a lower surface of said main portion and being inset relative to a peripheral wall of said main portion, said lip being complementarily sized and shaped relative to said flange portion such that said flange portion is retained by said lip when said lid is positioned over said access opening;

a first interior wall extending through said housing defining a fruit holding chamber and an air receiving chamber, said first interior wall extending inwardly from a first lateral side of said perimeter wall, said fruit holding chamber being configured for holding a plurality of fruit wedges therein, said perimeter wall of said fruit holding chamber being translucent to permit viewing into said interior space of said fruit holding chamber;

a second interior wall extending through said interior space of said housing, said second interior wall extending inwardly from a second lateral side of said perimeter wall, a bottom edge of said first interior wall being spaced from a bottom edge of said second interior wall and defining an output opening therebetween configured to receive the fruit wedges therethrough, each of said first and second interior walls slanting inwardly toward each other such that said first and second interior walls form a chute for directing the fruit wedges toward said output opening;

a base removably coupled to said housing, said base having a bottom and a peripheral wall coupled to and extending upwardly from said bottom, said base having an interior dividing wall extending therethrough defining a first compartment and a second compartment, said first compartment being positioned below said air receiving chamber, said second compartment being positioned below said fruit holding chamber, said bottom edge of said first interior wall being positionable on an upper edge of said interior dividing wall;

a pair of spaced flanges coupled to said housing, a first one of said flanges being positioned below said air receiving chamber, a second one of said flanges being positioned below said fruit holding chamber;

a pair of recessed areas extending into said base, a first one of said recessed areas being aligned with said first one of said flanges such that said first one of said recessed areas is configured to receive said first one of said flanges to releasably retain said housing on said base, a second one of said recessed areas being aligned with said second one of said flanges such that said second one of said recessed areas is configured to receive said second one of said flanges to releasably retain said housing on said base;

an extension coupled to said base, said extension being coupled to and extending downwardly from said bottom edge of said second interior wall when said housing is coupled to said base, said extension being parallel with respect to said interior dividing wall;

an input opening positioned in said base, said input opening being positioned below said output opening when said housing is coupled to said base such that said base is configured to receive the fruit wedges from said fruit holding chamber through said input opening;

an output door being pivotally coupled to said housing wherein said output door is selectively positionable between an opened position providing access to an interior of said second compartment and a closed position closing said output opening, said output door abutting said extension when said output door is in the opened position;

a slot extending into said base, said slot providing access to said interior of said second compartment;

a drawer being slidably insertable into said slot, said drawer having a bottom wall and a peripheral wall extending upwardly from said bottom wall, said peripheral wall of said drawer including a front wall, a rear wall and a pair of lateral side walls extending between said front and rear walls;

a projection coupled to and extending outwardly from said front wall of said drawer, said projection forming a handle configured to facilitate sliding of said drawer into and out of said slot;

a screen positioned in said interior of said second compartment, said screen extending between a first side of said base and said interior dividing wall, said screen being positioned below said output door and above said drawer when said drawer is fully extended into said base, said screen forming a platform configured to receive the fruit wedges thereon when the fruit wedges are passed into said second compartment through said output opening, said screen being configured to allow drainage from the fruit wedges to pass therethrough and down into said drawer;

a dispenser opening positioned in said base, said dispenser opening providing access to said interior of said second compartment;

a dispenser door being pivotally coupled to said base wherein said dispenser door is selectively positionable between an opened position providing access to said interior of said second compartment and a closed position closing said dispenser opening;

a refrigeration unit positioned within said first compartment, an upper surface of said refrigeration unit having vents positioned therein wherein said refrigeration unit is configured to cool said air receiving chamber;

a power supply coupled to said base, said power supply being electrically coupled to said refrigeration unit to selectively provide power to said refrigeration unit, said power supply comprising a power cord having a male plug-in end configured for being inserted into an external electrical outlet; and an actuator coupled to said base, said actuator being electrically coupled to said refrigeration unit wherein said actuator is selectively actuated to provide power to said refrigeration unit for selectively cooling said air receiving chamber.

* * * * *